Figure 1:
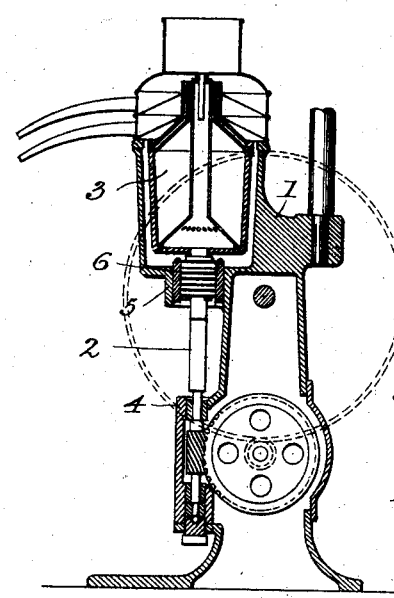

A. H. REID.
BEARING FOR SHAFTS, SPINDLES, &c.
APPLICATION FILED JAN. 10, 1908.

901,374.

Patented Oct. 20, 1908.

Witnesses
L. E. Morrison
D. E. Burdine

Inventor
A. H. Reid
By P. T. Dodge, Attorney

UNITED STATES PATENT OFFICE.

ALBAN H. REID, OF PHILADELPHIA, PENNSYLVANIA.

BEARING FOR SHAFTS, SPINDLES, &c.

No. 901,374.  Specification of Letters Patent.  Patented Oct. 20, 1908.

Application filed January 10, 1908. Serial No. 410,159.

*To all whom it may concern:*

Be it known that I, ALBAN H. REID, of Philadelphia, county of Philadelphia, and State of Pennsylvania, have invented a new and useful Improvement in Bearings for Shafts, Spindles, &c., of which the following is a specification.

This invention relates to bearings for shafts or spindles and is designed for use more particularly in connection with the spindles of centrifugal machines, such as cream separators, in which machines the separating bowl is carried on the upper end of a driving spindle suitably supported usually in two bearings, an upper one which serves to sustain the spindle in an upright position, and which may be termed the "supporting bearing", and a lower one which acts mainly to take the weight of the spindle and the parts connected thereto. In the operation of these machines, the spindle is driven at a very high speed, and by reason of the uneven distribution of the weight of the load in the bowl, there is a tendency to violent and rapid lateral vibrations of the bowl and spindle which if not restrained is very objectionable and destructive to the bearings and the parts of the machine generally. Many forms of bearings and contrivances have been designed to overcome these objections, which bearings are characterized mainly by the employment of springs so applied that while permitting the bearing to yield to a limited extent laterally to absorb or take up lateral vibrations of the parts, these springs tend also to return the shaft towards the center. Their action in this respect is, however, open to the objection that when suddenly released from a strain which is compressing them, they will react and throw the shaft off center again to the opposite side.

It is the aim of my invention to dispense with the use of special springs for this purpose, and at the same time provide a bearing which is flexible and may yield laterally to a limited extent in order to take up the shocks of vibration, and at the same time to cause the spindle or shaft to be "centered" and the equilibrium of the parts maintained.

With these ends in view, my improved bearing consists of a series of complementary nonrotatable members surrounding the driving spindle and affording a bearing for the same, which members are sustained by the machine-framing, and which are maintained in frictional engagement with each other in such manner that they may shift individually and independently of each other laterally with respect to the longitudinal axis of the spindle, and in relation to the machine-framing, and may also shift as a body and in unison with respect to the machine framing; whereby the lateral vibratory motion of the spindle will be effectually absorbed. These complementary members constituting the bearing are preferably in the form of disks, each with a central opening to snugly fit the spindle and afford a bearing for the same, which disks are preferably separated by spacing plates each containing a central opening slightly greater in diameter than the diameter of the shaft, which disks and spacing plates are maintained in frictional engagement with each other, conveniently by means of a number of clamping bolts extending through bolt holes in the disks and plates larger than the bolts, whereby a relative independent movement or play of the parts is permitted. The circumferential edges of the disks terminate somewhat inward of the circumferential edges of the spacing plates, which latter are adapted to fit within and bear against the internal surface of a socket or opening in the machine-frame in which the bearing as a whole is mounted, with the result that the spacing plates will serve as guides or supports for the disks, permitting them to shift laterally between the plates subject to the frictional resistance caused by the binding of the parts together by means of the clamping bolts.

The extent of lateral movement or play which is permitted the shaft by the movement of the disks within the socket or opening in the machine frame is very small, no more than one sixty-fourth of an inch, so that any lateral movement of the shaft beyond a true position of equilibrium is extremely slight. Such movement does in fact occur, however, not in a radial line from the true center of rotation, but in a spiral or tangential line, resulting in a gyratory motion such as a rapidly spinning top partakes of, and which naturally seeks a vertical position or center. Any resistance offered to this gyratory path will tend to arrest such motion by deflecting the path of movement to the opposite direction and approaching the center. The frictional resistance offered to the lateral motion of the disks between the spacing-plates, by resisting constantly any tendency of the shaft to move laterally in its gyratory or spiral path, coupled with the natural tendency of the rapidly rotating shaft to seek a center, keeps urging it, as it were, to a point where such resistance will not be felt, namely, a point of perfect equilibrium with the shaft revolving in a central position. It is seen, therefore, that while the shaft is permitted a slight lateral movement to absorb the sudden shocks due to the uneven distribution of the load in the bowl, there is a counter-acting tendency acting constantly to minimize this lateral movement, which action, together with the natural tendency of the shaft and its bowl to seek a center, gradually works the same back to a point of equilibrium.

By reason of the construction of the bearing as consisting of a number of complementary parts held in frictional engagement, a number of joints or spaces radiating from the axial center of the bearing is presented, which joints will act by capillary attraction on the oil supplied to the bearing, and will cause the same to flow to every part of the bearing and be accumulated in the joints, which will thus serve as reservoirs, so that there will be no necessity for employing a special oil cup as is usually the case in machines of this character. This effect may be increased by forming in the faces of the parts, sockets or oil pockets, as will be more fully described hereinafter.

Figure 2:
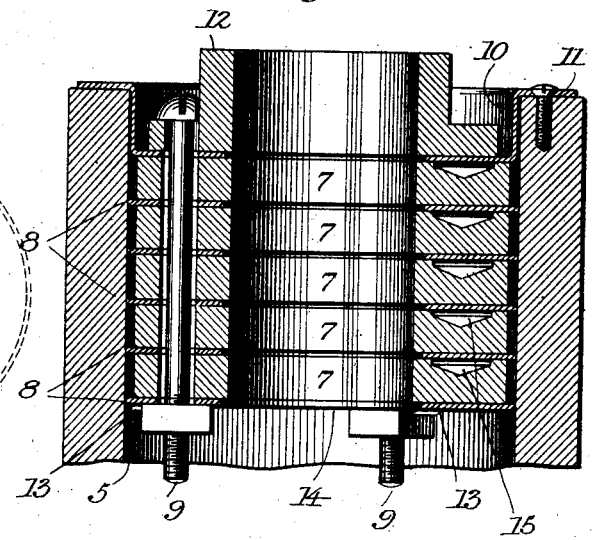
Figure 3:
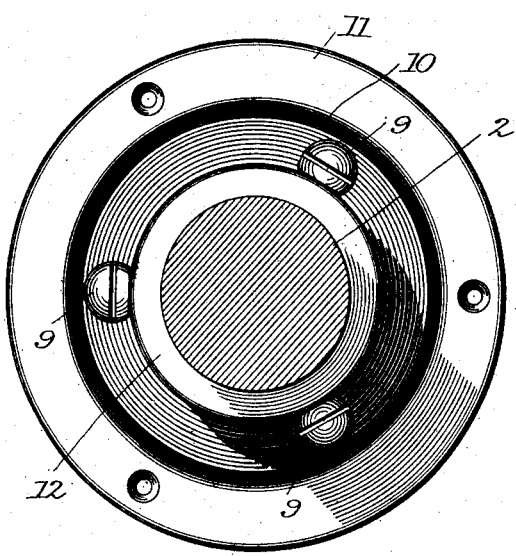
Figure 4:
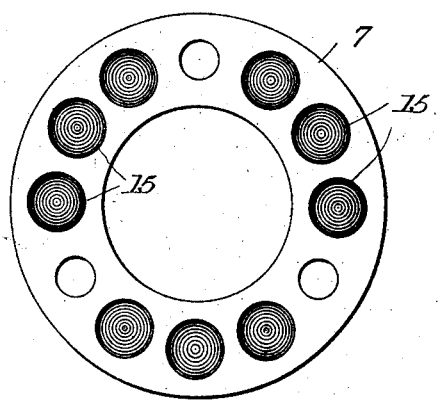

In the accompanying drawings:—Figure 1 is a sectional view of a centrifugal separator, showing the spindle and its supporting bearings, the upper bearing being constructed in accordance with my invention. Fig. 2 is a vertical longitudinal section through said bearing on an enlarged scale. Fig. 3 is a horizontal sectional plan view through the spindle, looking downward on the upper end of the bearing. Fig. 4 is a face view of one of the parts of the bearing showing the oil pockets formed therein.

Referring to the drawings:—1 represents the framing of a centrifugal machine; 2 a vertical spindle or shaft; and 3 a separating bowl fixed to the upper end of the spindle. The lower end of the spindle is sustained by a suitable bearing 4, while near its upper end just beneath the bowl, the spindle passes through a socket or opening 5 in the machine-framing, in which socket is mounted, so as to snugly surround the shaft, the upper bearing 6 constituting the present invention. This bearing consists of a number of rings or disks 7, preferably of phosphor bronze, each having a central opening which fits snugly and closely around the shaft so as to permit the latter to revolve therein, and a number of relatively thin spacing plates 8, each formed with central openings somewhat larger than the diameter of the shaft, which disks and plates are clamped side by side in frictional contact in the form of a cylindrical body, by means of a number of clamping bolts 9 extending through alining holes in the disks and plates, which holes are larger than the bolts, so that the clamped parts may shift laterally with reference to the bolts and each other. The outer circumferential edges of the spacing plates bear against the inner surface of the socket or opening 5 in the frame, while the circumferential edges of the intermediate disks terminate some distance inward of said internal surface, the result being that the spacing plates will form guides or supports for the disks, which latter owing to their relatively smaller diameter, may play and shift laterally between the plates and within the frame opening subject to the frictional resistance offered by the spacing plates, so that the spindle having a bearing within said disks, is flexibly supported and its lateral vibrations subjected to frictional restraint; whereby the shocks due to said vibratory movements are absorbed and counteracted.

In order to facilitate the mounting of the bearing within the frame opening, the upper spacing plate is provided with a circumferential vertical flange 10 which fits within the opening in the frame, the edge of which is extended horizontally outward in the form of a supporting lip 11, resting on the horizontal portion of the frame surrounding the opening, to which frame the bearing may be fastened by screws passing through the lip, as shown in Fig. 2. The upper disk seated within the flange 10, is formed with an upwardly extending neck 12, and the clamping bolts have their heads flattened on one side so as to bear against this neck and prevent the bolts from turning, the necessary friction between the disks and plates being produced by tightening up the nuts on the opposite ends of the bolts, which latter are locked by means of lips 13 bent outwardly from a ring or plate 14 applied over the bolts against the lower disk.

As a result of the construction described, it will be observed that the spindle is flexibly sustained by its upper bearing in such manner that its lateral vibratory motions are subjected to frictional restraint determined and controlled by the degree of clamping action to which the parts may be subjected by the clamping bolts. It will be observed also that the disks are shiftable independently of each other between the spacing and guiding plates, which action allows the parts to accommodate themselves to the varying distances which the disks will move laterally, due to the inclined position which the spindle will assume in its lateral movements, the disks at the upper end of the bearing moving a greater distance than those at the lower end, by reason of the different distances they occupy from the lower end of the shaft, which represents the fulcrum on which the shaft tips in its lateral vibrations.

While by reason of the composite nature of the bearing a great number of joints and crevices are presented which will act capillarily on the lubricating oil and which will act to hold a considerable quantity of the oil, this effect may be increased by forming in the faces of the disks, pockets or cavities 15, as shown in Fig. 4. These pockets communicate with the joints between the parts, and in their collective capacity will hold a sufficient quantity of the oil in reserve to render the use of a special oil cup or reservoir, such as is usually employed, unnecessary.

My bearing as formed in the manner illustrated and described, is of very simple and durable construction, easy of application, and effectually performs the functions for which it was designed, and this without the employment of the usual special controlling springs, and the usual oil cup or reservoir.

It will be noted that in my construction the means by which the parts of the bearing are held in frictional contact, that is, the clamping bolts, are themselves unyielding, the self-centering of the bearing or the return of the spindle to its true vertical centered position or equilibrium, being effected by the constant frictional resistance which is offered to the lateral movement of the spindle, coöperating with the natural tendency of the spindle to seek a central position.

Having thus described my invention, what I claim is:—

1. In combination with the frame, a rotary spindle, a bearing for the spindle comprising a plurality of nonrotating disks formed with openings to closely receive the spindle and mounted in the frame to shift laterally, and means for applying a frictional resistance to the lateral movements of the disks.

2. In combination with the frame, a rotary spindle, a bearing for the spindle comprising a plurality of nonrotating disks formed with openings to closely receive the spindle and mounted in the frame to shift laterally independently of each other, and means for applying a frictional resistance to the lateral movements of the disks.

3. In combination with the frame, a vertical rotary spindle, a bearing for the spindle comprising a plurality of nonrotating disks formed with openings to closely receive the spindle, a nonrotating spacing plate between the disks, said parts being so mounted in the frame that the disks may shift laterally with reference to the spacing plate, and means for applying a frictional resistance to the lateral movements of the disks.

4. In combination with the frame, a rotary spindle, a plurality of nonrotating disks formed with openings to receive and afford a bearing for the spindle and shiftable laterally with respect to the frame, nonrotating spacing plates situated between the disks and held by the frame against lateral movement, and means for holding the disks and plates frictionally together.

5. In combination with a frame, a rotary spindle, a laterally shiftable nonrotating disk formed with an opening in which the spindle is rotatably mounted, nonrotating plates sustained by the frame against lateral movement and bearing on the opposite sides of the disk, and unyielding means for clamping the disk between the plates.

6. In combination with a frame, a rotary spindle, a plurality of laterally shiftable nonrotating disks formed with openings in which the spindle is rotatably mounted, nonrotating spacing plates situated respectively between the disks and sustained by the frame against lateral movement, and unyielding means for clamping the plates and disks together.

7. In combination with the frame, a rotary spindle, a plurality of nonrotating disks shiftable laterally independently of each other and formed with openings in which the spindle is rotatably mounted, relatively fixed spacing plates situated respectively between the disks and sustained by the frame, and means for clamping the plates and disks together frictionally.

8. A spindle-bearing comprising a plurality of nonrotating disk-like bearing rings within which the spindle is adapted to be rotatably mounted, nonrotating spacing plates situated between the bearing rings and in relation to which said rings may shift laterally, and means for holding said parts frictionally together.

9. A spindle-bearing comprising a plurality of disks formed with openings to conjointly form a bearing for the spindle, a plurality of spacing plates formed with openings greater in diameter than the diameter of the spindle; whereby said disks and spindle may shift laterally with relation to the plates, said disks and plates being provided with bolt holes, and clamping bolts extending through said holes, the bolts and holes being of relative size to permit the disks to shift relatively to the plates.

10. In combination with the frame formed with an opening or socket, a rotary spindle extending therethrough, a plurality of bearing disks closely surrounding the spindle and affording a bearing for the same and terminating at their circumferential edges some distance inward of the inner surface of the socket; whereby said disks may shift laterally within the socket, a plurality of spacing plates situated respectively between the disks and fitting closely within the socket so as to be held against laterally shiftable motion, said plates being formed with central openings greater in diameter than that of the spindle, and means for clamping the plates and disks frictionally together.

11. In a spindle bearing, the combination with nonrotating bearing disks formed with oil holding pockets in their side faces, nonrotating spacing plates situated between said disks, and means for clamping said parts together.

In testimony whereof I hereunto set my hand this twenty fourth day of December, 1907, in the presence of two attesting witnesses.

ALBAN H. REID.

Witnesses:
W. SHERWOOD CROWL,
SYLVESTER HEATH.